United States Patent
Yang et al.

(10) Patent No.: US 8,929,811 B2
(45) Date of Patent: Jan. 6, 2015

(54) TERMINAL, SYSTEM, AND METHOD FOR RETRIEVING AN APPLICATION USING NFC HEADER INFORMATION

(75) Inventors: Dong Ho Yang, Seoul (KR); Jong Kwon Lee, Seoul (KR)

(73) Assignee: Pantech Co., Ltd., Seoul (KR)

( * ) Notice: Subject to any disclaimer, the term of this patent is extended or adjusted under 35 U.S.C. 154(b) by 183 days.

(21) Appl. No.: 13/570,213

(22) Filed: Aug. 8, 2012

(65) Prior Publication Data

US 2013/0052949 A1   Feb. 28, 2013

(30) Foreign Application Priority Data

Aug. 24, 2011   (KR) .................. 10-2011-0084419

(51) Int. Cl.
*H04W 4/00*   (2009.01)

(52) U.S. Cl.
CPC .............. *H04W 4/008* (2013.01); *H04W 4/001* (2013.01)
USPC ...................................... 455/41.1; 455/414.1

(58) Field of Classification Search
CPC ........ H04W 4/003; H04W 4/008; H04B 5/00; H04B 5/0056
USPC .......... 455/41.2, 556.1, 414.1, 418, 566, 41.1
See application file for complete search history.

(56) References Cited

U.S. PATENT DOCUMENTS

| | | |
|---|---|---|
| 2004/0087273 A1 | 5/2004 | Perttila et al. |
| 2006/0049258 A1 | 3/2006 | Piikivi |
| 2008/0207128 A1 | 8/2008 | Mikko |
| 2009/0247077 A1 | 10/2009 | Sklovsky et al. |
| 2010/0227553 A1 | 9/2010 | Charrat et al. |

FOREIGN PATENT DOCUMENTS

| | | |
|---|---|---|
| KR | 10-0857825 | 9/2008 |
| KR | 10-2009-0119269 | 11/2009 |
| KR | 10-2010-0072115 | 6/2010 |
| WO | 2006/090460 | 8/2006 |
| WO | 2009141764 | 11/2009 |
| WO | 2009/146781 | 12/2009 |
| WO | 2010/077194 | 7/2010 |
| WO | 2010118615 | 10/2010 |

OTHER PUBLICATIONS

European Search Report for corresponding EP Application No. 12180602.0-2413 dated Dec. 5, 2012.

*Primary Examiner* — Blaine J Jackson (74) *Attorney, Agent, or Firm* — H.C. Park & Associates, PLC

(57) ABSTRACT

A terminal includes: a near field communication (NFC) reading unit to acquire tag information via NFC; an NFC tag information processor to extract NFC header information from the tag information; and a memory to store the NFC header information. The NFC tag information processor analyzes the NFC header information, and installs and executes an application based on the NFC header information. A method for retrieving an application, includes: acquiring tag information; extracting near field communication (NFC) header information from the tag information; retrieving the application based on the tag information; and installing and executing the application.

18 Claims, 7 Drawing Sheets

| NFC HEADER INFORMATION |
| --- |
| APPLICATION ID |
| APPLICATION NAME |
| APPLICATION VERSION |
| MANUFACTURE ID |
| APPLICATION LIST |
| DATA TYPE |
| EXTENSION INFORMATION |
| ⋮ |

TERMINAL, SYSTEM, AND METHOD FOR RETRIEVING AN APPLICATION USING NFC HEADER INFORMATION

CROSS-REFERENCE TO RELATED APPLICATION

This application claims priority from and the benefit under 35 U.S.C. §119(a) of Korean Patent Application No. 2011-0084419, filed on Aug. 24, 2011, which is incorporated by reference for all purposes as if fully set forth herein.

BACKGROUND

1. Field

Exemplary embodiments of the present invention relate to a system and method for retrieving an application, selecting, and executing an application suitable for tag information read from a near field communication (NFC) tag in an NFC terminal.

2. Discussion of the Background

Near field communication (NFC) is a short range technique for communication, and may utilize radio frequency identification (RFID). Further NFC may allow the transmission of data between terminals using a non-contact NFC module using a frequency band of 13.56 MHz at a distance such as 10 cm.

Terminals, such as a smart phone or tablet, have been implemented with an NFC module mounted on or in the device. Applications using NFC technology also have been implemented.

Figure 1:
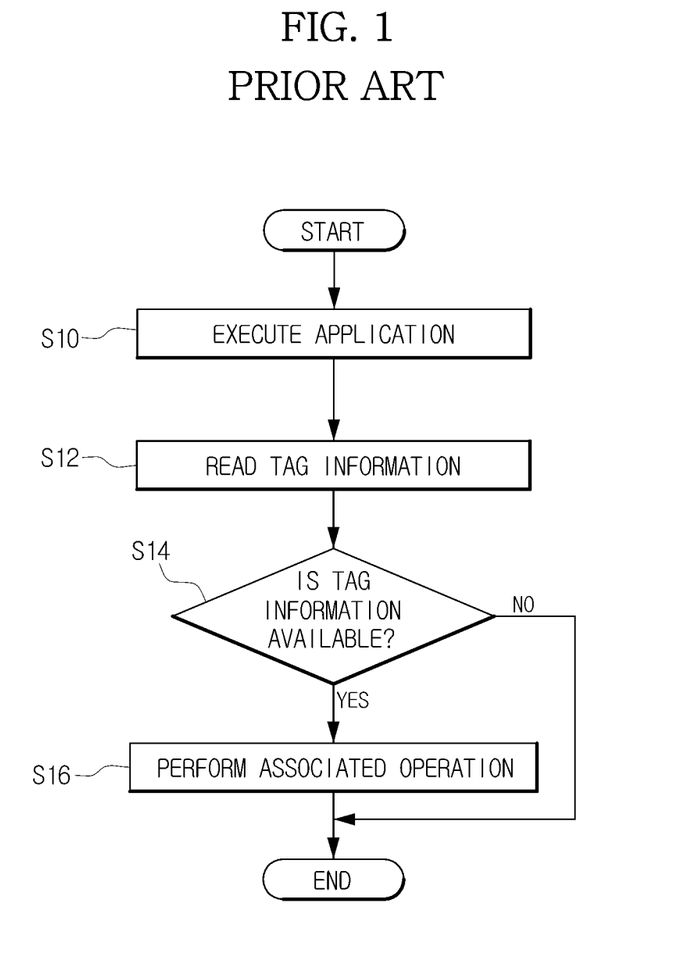
FIG. 1 is a flowchart illustrating a method for executing an application according to the prior art.

FIG. 1 is a flowchart illustrating a method for executing an application according to the prior art.

First, a user of a NFC terminal executes an available application (S10), and tag information is read from the NFC tag using a NFC reader (S12).

Then, it is determined whether the tag information read in operation S12 is available in the application executed by the terminal in operation S10 (S14), and if so, an associated operation is performed using the tag information (S16). If no tag information is available, the operation terminates.

Thus, an application is executed before tag information is read.

Figure 2:
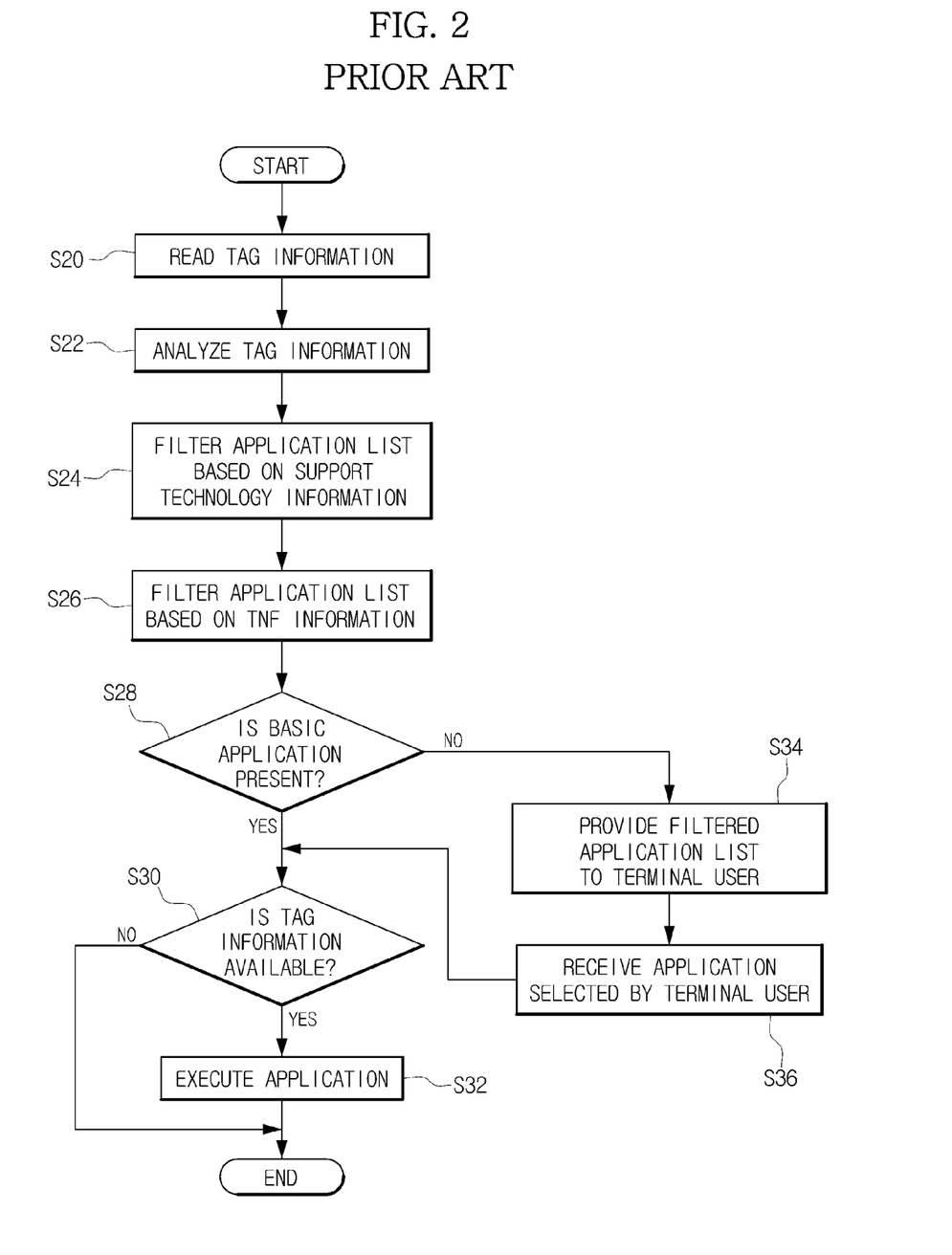
FIG. 2 is a flowchart illustrating a method for executing an application according to the prior art.

FIG. 2 is a flowchart illustrating a method for executing an application according to the prior art.

First, an NFC terminal reads tag information from an NFC tag (S20), analyzes the read tag information (S22), filters an available application list based on supported technology information obtained by analyzing the tag information (S24), and filters the application list filtered in operation S24, based on Type Name Format (TNF) information obtained by analyzing the tag information (S26).

Thereafter, it is determined whether a basic application, which may have been set by a terminal user, is present (S28), and if the basic application is present, a determination is made as to whether the tag information read in operation S20 is available in the basic application (S30). If the tag information is available, the basic application is executed and an associated operation using the tag information is performed (S32). If the tag information is not available, the operation terminates.

If it is determined that the basic application is not present in operation 28, the available application list filtered in operations S24 and S26 may be displayed to the terminal user (S34).

Thereafter, the terminal user may select an application from the displayed application list (S36), and a determination of whether the tag information read in Operation 20 is available in the application selected by the terminal user is performed (S30). If the tag information is available, the application selected by the terminal user is executed, and may perform an associated operation using the tag information. If the tag information not available, the operation terminates.

As described above, in the related art, an operation is performed using an application set as the basic application. Alternatively, if the number of filtered applications is one or more, an application is selected by a terminal user to perform an operation. However, the basic application or the application selected may not recognize the tag information, and thus may not perform the operation.

SUMMARY

Exemplary embodiments of the present invention provide a near field communication (NFC) terminal, system, and a method for retrieving an application, selecting, and executing an application suitable for tag information read from a near field communication (NFC) tag in an NFC terminal.

Additional features of the invention will be set forth in the description which follows, and in part will be apparent from the description, or may be learned by practice of the invention.

An exemplary embodiment of the present invention discloses a terminal, including: a near field communication (NFC) reading unit to acquire tag information via NFC; an NFC tag information processor to extract NFC header information from the tag information; and a memory to store the NFC header information. The NFC tag information processor analyzes the NFC header information, and installs or executes an application based on the NFC header information.

An exemplary embodiment of the present invention discloses a method for retrieving an application, including: acquiring tag information; extracting near field communication (NFC) header information from the tag information; retrieving the application based on the tag information; and installing the application.

An exemplary embodiment of the present invention discloses a system to allow the retrieval of an application, including: a near field communication (NFC) terminal, comprising: an NFC reading unit to acquire tag information via NFC; an NFC tag information processor to extract NFC header information from the tag information; a communication unit to communicate with a NFC management server and the NFC management server; the NFC management server, including: a second communication unit to communicate with the NFC terminal; wherein the communication unit communicates with the second communication a request to retrieve the application based on NFC header information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION OF THE ILLUSTRATED EMBODIMENTS

Exemplary embodiments now will be described more fully hereinafter with reference to the accompanying drawings, in which exemplary embodiments are shown. The present disclosure may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art. In the description, details of well-known features and techniques may be omitted to avoid unnecessarily obscuring the presented embodiments.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 3:
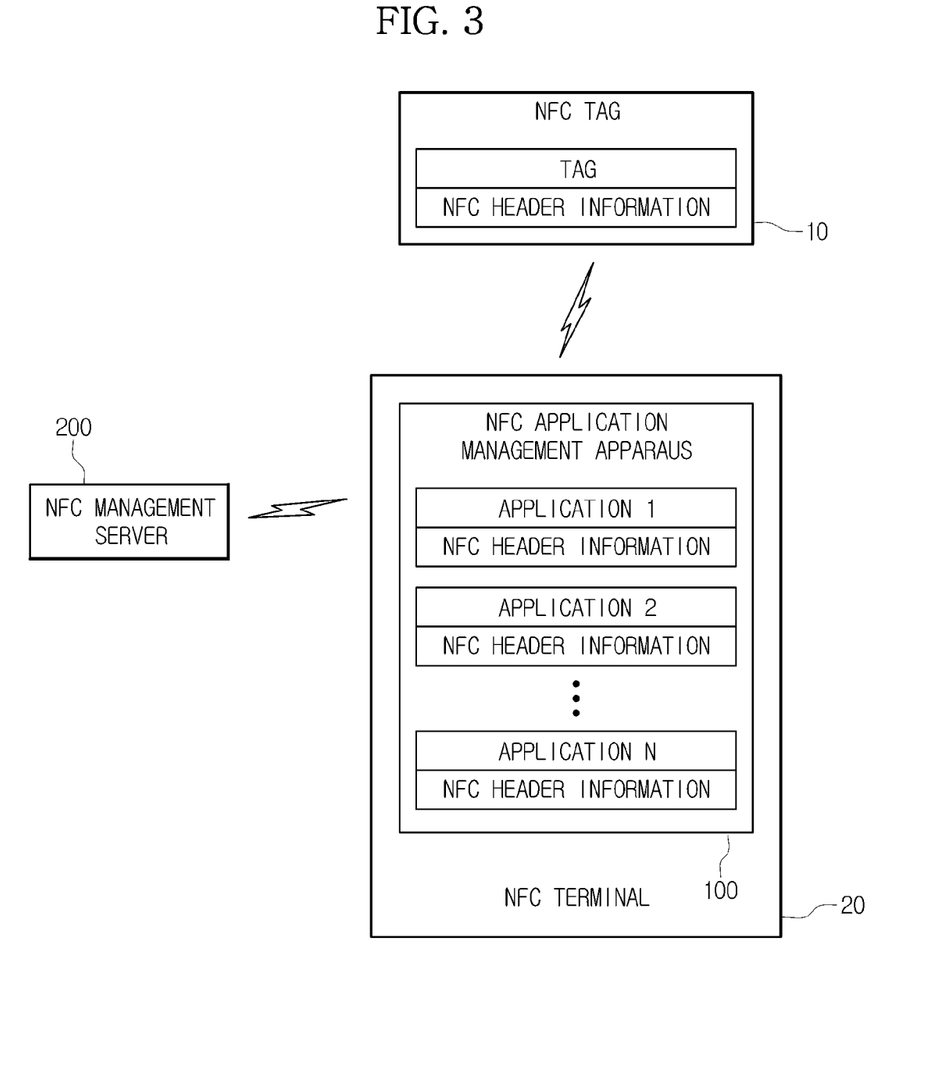
FIG. 3 is a schematic diagram illustrating a system to execute an application according to an exemplary embodiment of the present invention.

FIG. 3 is a schematic diagram illustrating a system to execute an application according to an exemplary embodiment of the present invention.

Referring to FIG. 3, if an application that utilizes or has the capability to utilize NFC technology is installed, a NFC application management apparatus 100 included in a NFC terminal 20 analyzes NFC header information of the application, establishes an application list suitable for the NFC header information, stores the application list in a memory, and manages the application list. If the NFC header information is not present in the application to be installed, the NFC application management apparatus 100 transmits information about the application to be installed to a NFC management server 200 and requests the NFC header information of the application. In this way, the header information of an NFC application to be installed is either sourced from provided information, or retrieved from another source.

In this disclosure, the term NFC header information may refer to extended NFC header information.

If tag information is read from a NFC tag 10, the NFC application management apparatus 100 analyzes the NFC header information included in the read tag information and detects a presence of an application suitable for the tag information from the application list using the analyzed information. The application from the application list may be installed and/or executed using the analyzed information. If the suitable application for the tag information is not detected, the NFC application management apparatus 100 transmits the NFC header information included in the tag information to the NFC management server 200, and requests a suitable application list for the NFC header information included in the tag information.

If the request is received from the NFC application management apparatus 100, the NFC management server 200 retrieves the NFC header information from a memory, based on application information, or NFC header information included in the tag information, received from the NFC application management apparatus 100, and transmits the retrieved NFC header information to the NFC application management apparatus 100.

Additionally, or in lieu of the request made above, the NFC application management apparatus 100 may request an application list from the NFC management server 200. Thus, the NFC management server 200 may create a suitable application list based on the NFC header information received from the NFC application management apparatus 100, and transmit the application list to the NFC application management apparatus 100.

Figure 4:
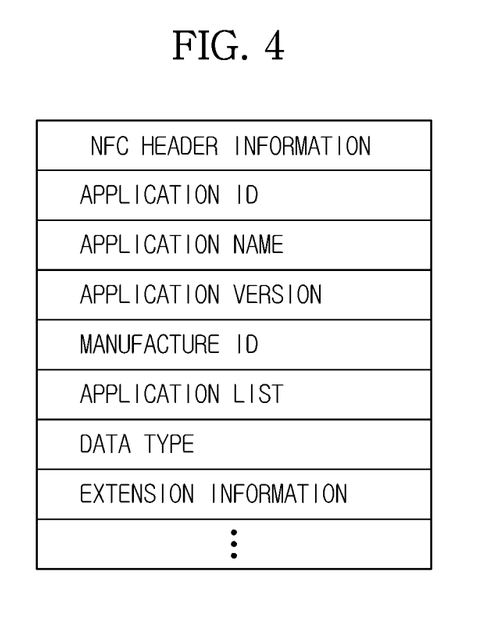
FIG. 4 is a diagram illustrating NFC header information according to an exemplary embodiment of the present invention.

FIG. 4 is a diagram illustrating NFC header information according to an exemplary embodiment of the present invention.

Referring to FIG. 4, the NFC header information includes an application ID, an application name, an application version, a manufacture ID, an application list which may use the tag information, a data type defined in an NFC application management apparatus, and extension information. For example, each of the data set items described above may be described in the following way: Application ID: a unique ID associated with an application if executed; Application Name: a name unique to an application; Application Version: a version number associated with the application described in the header; Manufacturer ID: Tag or the company that created the application ID; Extension: i.e an editable field to be added or implemented at the discretion of a designer or user; application list: the list of applications that may be used; Extension Information: Scalable Data.

Figure 5:
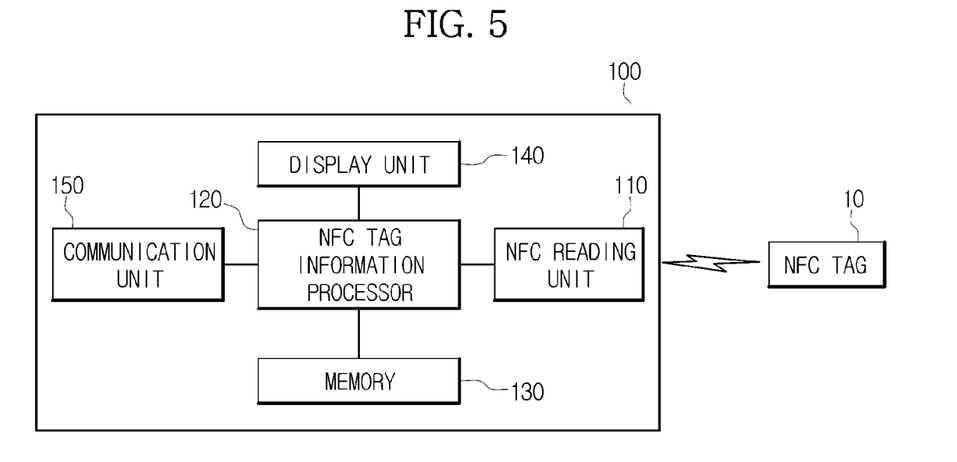
FIG. 5 is a schematic diagram illustrating an NFC application management apparatus according to an exemplary embodiment of the present invention.

FIG. 5 is a schematic diagram illustrating an NFC application management apparatus according to an exemplary embodiment of the present invention.

Referring to FIG. 5, a NFC reading unit 110 reads tag information from a NFC tag 10.

If a NFC tag 10 is read, or an application utilizes NFC, and prompts a reading of the NFC tag 10, a NFC tag information processor 120 analyzes NFC header information associated with the application, establishes a suitable application list based on the NFC header information, and stores the application list in a memory 130. If the NFC header information is detected based on the reading of the NFC tag 10, the NFC tag information processor 120 transmits information about an application to be installed to the NFC management server 200 through a communication unit 150, and requests the NFC header information of the application to be installed.

If tag information is read from the NFC tag 10 using the NFC reading unit 110, the NFC tag information processor 120 analyzes the NFC header information included in the read tag information and detects a presence of an application from the application list stored in the memory 130 using the analyzed information. The application from the application list may be installed and/or executed using the analyzed information. This application may use the tag information during the execution. An application may not be detected due to NFC header information not being present or corresponding to any of the applications stored in the memory 130. Accordingly, if no applications are detected, the NFC tag information processor 120 may transmit the NFC header information included in the tag information to the NFC management server 200 through the communication unit 150 to request an application list containing applications corresponding to the NFC header information. If the application list is received from the NFC management server 200 as a response to the request for the application list, an application which may utilize the tag information is retrieved from applications stored in the NFC terminal 20 based on the received application list, and the retrieved application is executed if the application which may use the tag information is retrieved or selected to be retrieved. If the application which may use the tag information is not retrieved from the application list received from the NFC management server 200, application information (e.g., an application name) and an installation path (e.g., URL information for downloading an application) included in the application list received from the NFC management server 200 may be provided, thereby allowing a terminal user the ability to retrieve an application corresponding to the tag information.

The memory 130 stores and manages the application list established by the NFC tag information processor 120, and may further store information about correspondences between NFC header information and applications.

A display unit 140 may display an application list from either the memory 130, or an application list provided from another source.

The communication unit 150 allows for communication with the NFC management server 200.

Although, as described above, the memory 130 is included in the NFC application management apparatus 100, the memory 130 may not be provided as part of the NFC application management apparatus 100. For example, the NFC application management apparatus 100 may communicate with the NFC management server 200 to use the memory 230 of the NFC management server 200 in real time.

Figure 6:
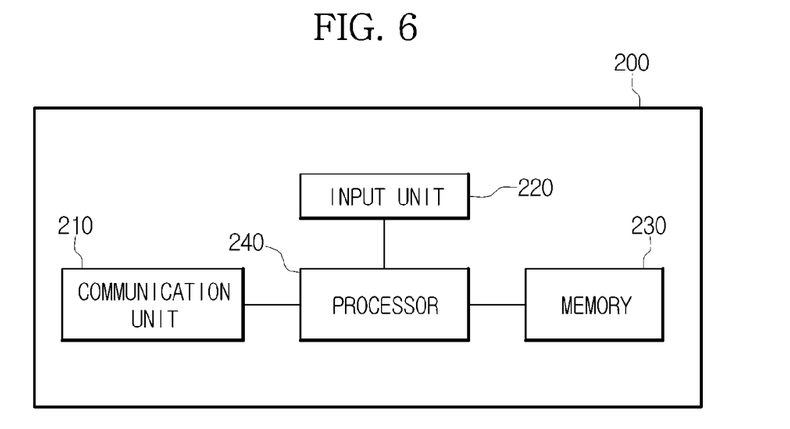
FIG. 6 is a schematic diagram illustrating an NFC management server according to an exemplary embodiment of the present invention.

FIG. 6 is a schematic diagram illustrating an NFC management server according to an exemplary embodiment of the present invention.

Referring to FIG. 6, a communication unit 210 performs communication with the NFC application management apparatus 100.

An input unit 220 receives information about applications and the NFC header information of applications from the NFC management server manager and stores them in a memory 230.

The memory 230 maps and stores the information about applications and the NFC header information of the applications received from the input unit 220.

If application information is received from the NFC application management apparatus 100 via the communication unit 210 and the NFC header information is requested, a processor 240 retrieves the NFC header information from the memory 230 based on the application information received from the NFC application management apparatus 100 and transmits the retrieved NFC header information to the NFC application management apparatus 100.

If NFC header information is received from the NFC application management apparatus 100 via the communication unit 210 and an application list is requested, the processor 240 retrieves applications based on the NFC header information from the memory 230, configures the application list, and transmits the application list to the NFC application management apparatus 100.

Figure 7:
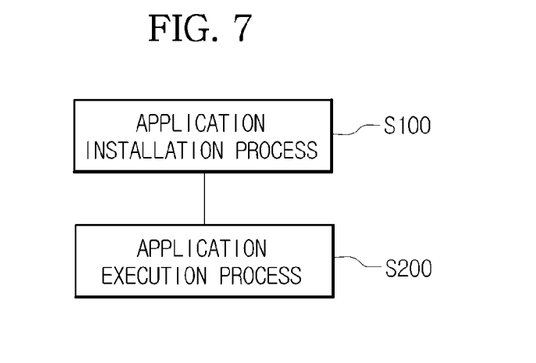
FIG. 7 is a flowchart illustrating a method for executing an application according to an exemplary embodiment of the present invention.

FIG. 7 is a flowchart illustrating a method for executing an application according to an exemplary embodiment of the present invention.

Referring to FIG. 7, in operation S100, an application installation process is performed by analyzing NFC header information of an application to be installed, configuring a list of suitable applications based on a reference NFC header information, and storing the configured application list in a memory, for use when the NFC application management apparatus 100 installs an application of the application list capable of using the NFC technology. In operation S200 an application execution process is performed by reading tag information from a source to extract NFC header information, analyzing the NFC header information included in the read tag information and detecting a presence of an application which may use the tag information from the application list. The application from the application list may be installed and/or executed using the analyzed information.

Figure 8:
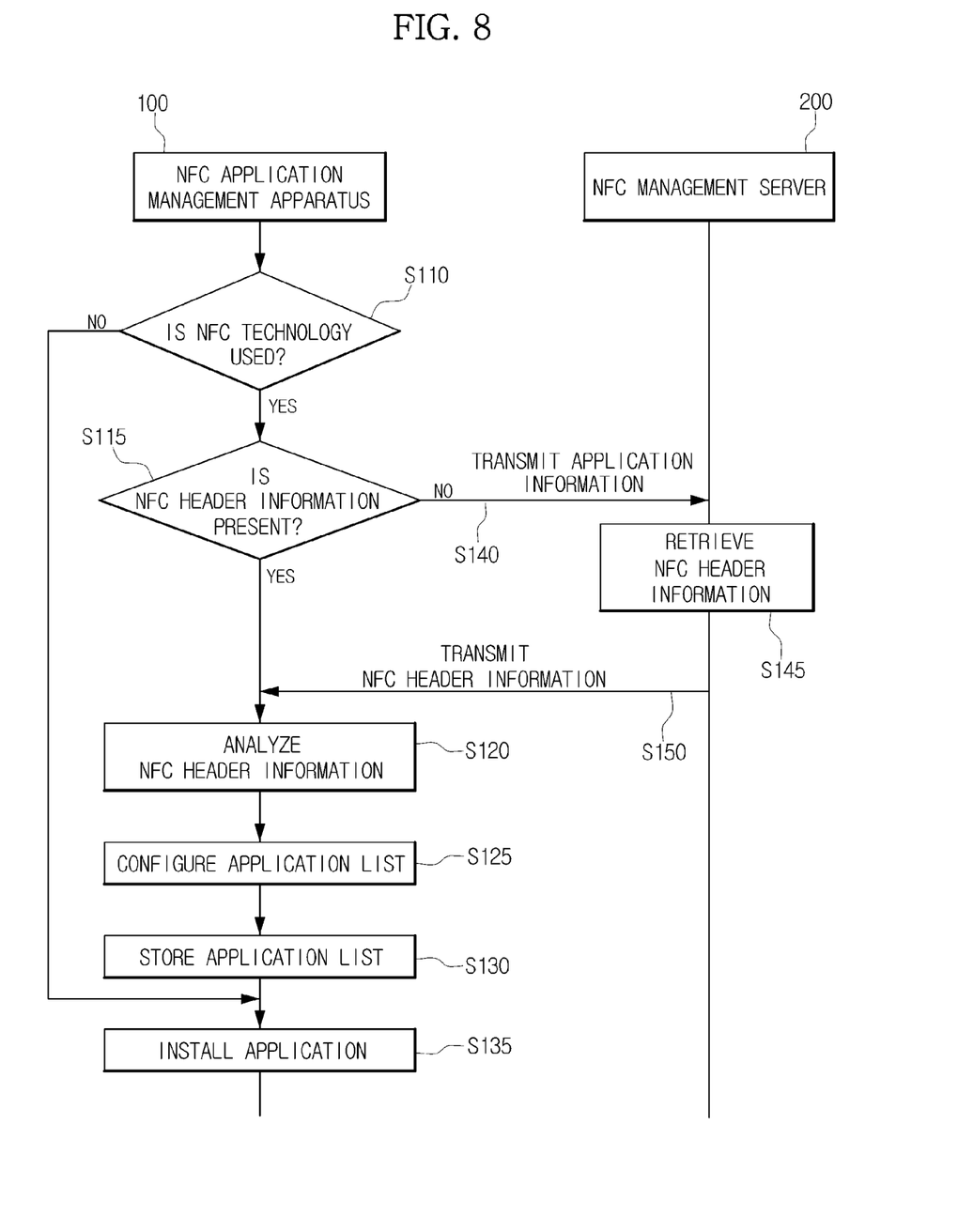
FIG. 8 is a flowchart illustrating a method for installing an application according to an exemplary embodiment of the present invention.

FIG. 8 is a flowchart illustrating a method for installing an application according to an exemplary embodiment of the present invention. The method will be described as if performed by the NFC application management apparatus 100 and NFC management server 200, as previously described, but is not limited as such.

First, the NFC tag information processor 120 of the NFC application management apparatus 100 determines whether the application to be installed by the terminal user uses the NFC technology (S110).

The method for determining whether the application uses the NFC technology in Operation S110 may be supported by an operating system (OS) and may be performed using information included in the header of the application.

If it is determined that the application to be installed does not use the NFC technology in Operation S110, the application is installed (S135).

If the application to be installed is determined to use NFC technology in Operation S110, a determination is made as to whether the NFC header information is part of a request for an application to be installed (S115).

If yes, the NFC header information is analyzed (S120), a list of suitable applications for the NFC header information is configured based on the analyzed information (S125), the configured application list is stored in a memory (S130), and the application is installed (S135).

If it is determined that the NFC header information is not included for an application to be installed in Operation S115, the information of the request is transmitted to a NFC management server through a communication unit to request a corresponding NFC header information of the application (S140).

The NFC management server 200 which receives the request for the NFC header information from the NFC application management apparatus in Operation S140 retrieves the NFC header information from a memory based on the application information received from the NFC application management apparatus (S145) and transmits the retrieved NFC header information to the NFC application management apparatus (S150).

The NFC application management apparatus may progress to Operation S120, and analyze the NFC header information received from the NFC management server, configures the application list (S125), store the configured application list in the memory (S130), and if an application is selected from the stored application list, install and/or execute the application (S135).

Figure 9:
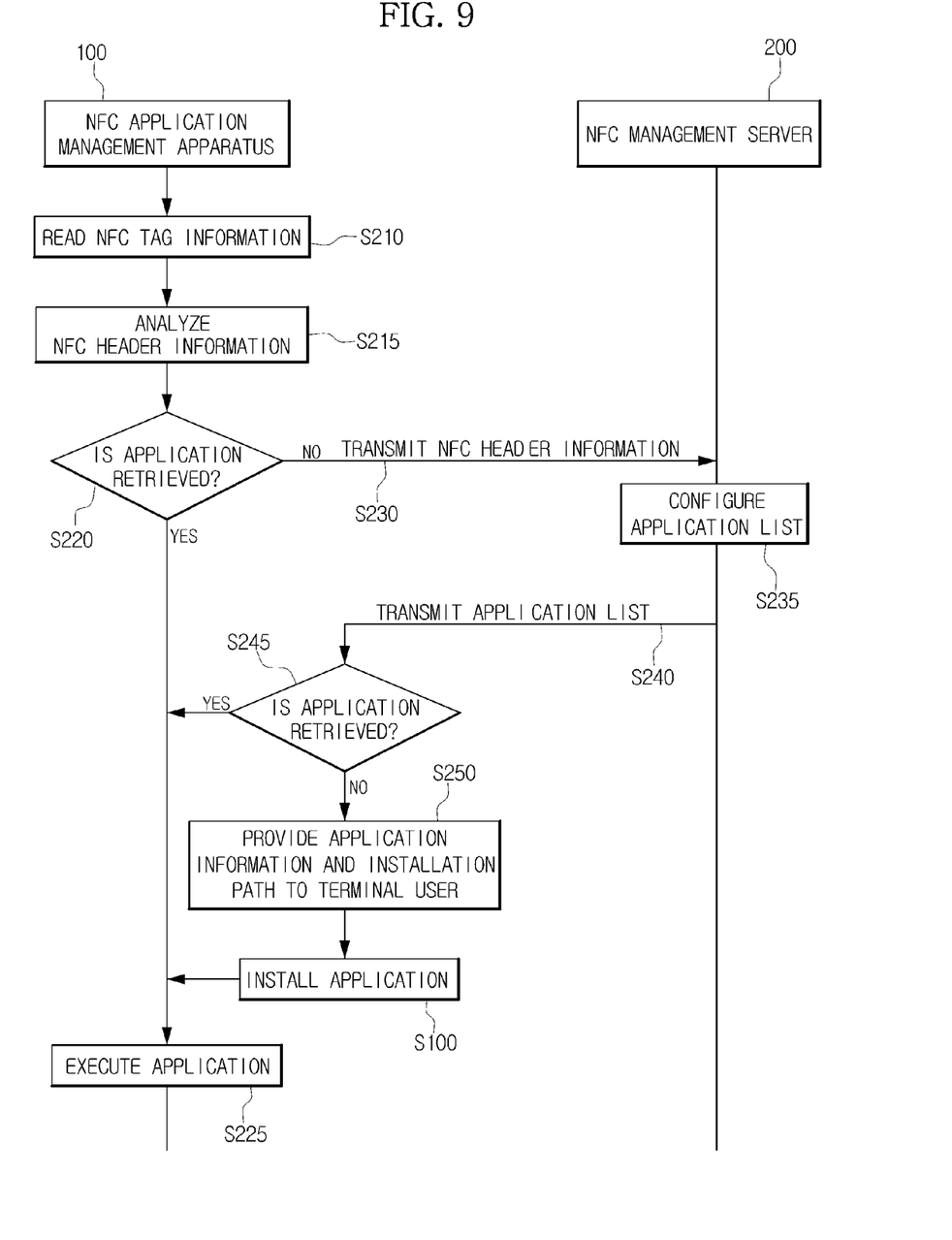
FIG. 9 is a flowchart illustrating a method for executing an application according to an exemplary embodiment of the present invention.

FIG. 9 is a flowchart illustrating a method of executing an application according to an exemplary embodiment of the present invention. The method will be described as if performed by the NFC application management apparatus 100 and NFC management server 200, as previously described, but is not limited as such.

First, if tag information is read from an NFC tag using the NFC reading unit 110 (S210), the NFC tag information processor 120 analyzes the NFC header information included in the tag information read from the NFC tag 10 (S215) and retrieves an application that may utilize the tag information from an application list stored in a memory 130 of the device reading the NFC tag (S220). Further, an optimal application may be selected based on various conditions and parameters, such as the amount an application matches the information obtained from the tag, and the like.

If an application is retrieved in Operation S220, the retrieved application is executed to perform an operation (S225).

If no application is retrieved in Operation S220, for example if none of the applications stored in the memory match the read tag information, the read tag information, including the NFC header information included in the tag information, is transmitted to the NFC management server through a communication unit to request a list of suitable applications corresponding to the NFC header information (S230).

The NFC management server may configure a list of suitable applications based on the received NFC header information and transmit the configured application list to the NFC application management apparatus (S240).

The NFC application management apparatus determines whether an application is retrievable from the transmitted application list received from the NFC management server (S245). If yes, the user of the NFC application management apparatus may install an application from the list (S225).

The NFC application management apparatus stores the received application list in the memory. The installed application may be executed.

If the NFC management server provides an empty list of applications, or there are no available applications contained in the NFC application management apparatus in Operation S245, application information (e.g., an application name) and installation information, which may include an installation path (e.g., URL information for downloading an application) or code that may be executed with or without a user's selection to retrieve and install the application, may be provided to the terminal user, so that an application that utilizes the tag information may be downloaded and installed (S250).

According to the concepts disclosed herein, a terminal user by reading a tag via NFC, may allow a terminal to install and execute an application. Thus, a terminal may be prevented from accessing, installing or executing an application before reading the tag information. Therefore, according to the aspects disclosed herein, a user of a terminal may more securely and conveniently operate the terminal.

The system and method for executing the application according to the present disclosure is not limited to the above-described embodiments and various modifications may be made without departing from the scope of the present disclosure. For example, although the NFC application management apparatus reads the tag information from the NFC tag, while two terminals perform end-to-end communication, when a transmission terminal transmits NFC Data Exchange Format (NDEF) data including NFC header information to a reception terminal, the reception terminal may analyze the NFC header information included in the data and automatically select and install and/or execute an application which may use the data.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal, comprising:
a near field communication (NFC) reading unit to acquire tag information via NFC;
an NFC tag information processor to extract NFC header information from the tag information; and
a memory to store the NFC header information,
wherein the NFC tag information processor analyzes the NFC header information, and executes an application corresponding to the analyzed NFC header information, if the application is detected in the terminal, and
if the application is not detected in the terminal, the NFC tag information processor transmits, to an NFC management server, NFC header information and receives a list of one or more applications corresponding to the NFC header information, and the memory stores the received list of one or more applications.

2. The terminal according to claim 1, further comprising:
a communication unit to communicate with the NFC management server,
wherein the communication unit communicates a request to the NFC management server based on the NFC header information.

3. The terminal according to claim 2, wherein in response to communicating the request, the terminal receives the list of one or more applications corresponding to the NFC header information.

4. The terminal according to claim 3, further comprising a display unit to display the list of one or more applications.

5. The terminal according to claim 2, wherein in response to communicating the request, the terminal receives installation information for the one or more applications based on the NFC header information.

6. The terminal according to claim 1, wherein the execution of the application is automatically performed based on the analyzed NFC header information.

7. The terminal according to claim 1, wherein the memory stores a mapping between the NFC header information and the list of one or more applications, and at least one of the applications is selected from the list of one or more applications.

8. A method for retrieving an application, comprising:
acquiring tag information;
extracting near field communication (NFC) header information from the tag information;
retrieving the application corresponding to the NFC header information, and executing the application, if the application is detected in the terminal; and
if the application is not detected in the terminal, transmitting, to an NFC management server, NFC header information, receiving a list of one or more applications corresponding to the NFC header information, and storing the received list of one or more applications.

9. The method according to claim 8, wherein acquiring the tag information comprises reading an NFC tag via NFC.

10. The method according to claim 8, further comprising communicating a request to the NFC management server based on the NFC header information.

11. The method according to claim 10, further comprising receiving the list of one or more applications corresponding to the NFC header information in response to communicating the request.

12. The method according to claim 11, further comprising displaying the list of one or more applications.

13. The method according to claim 10, further comprising receiving installation information for the application based on the NFC header information in response to communicating the request.

14. The method according to claim 8, wherein the execution of the application is automatically performed based on the extracted NFC header information.

15. The method according to claim 8, further comprising storing a mapping between the NFC header information and the list of one or more applications; and
allowing a user to select the application from the list of one or more applications.

16. A system to retrieve an application, comprising:
a near field communication (NFC) terminal, comprising:
an NFC reading unit to acquire tag information via NFC;
an NFC tag information processor to extract NFC header information from the tag information; and
a first communication unit to communicate with an NFC management server;
the NFC management server, comprising:
a second communication unit to communicate with the NFC terminal;
wherein the first communication unit transmits a request to the second communication unit, the request to retrieve a list of one or more applications corresponding to the NFC header information, and the second communication unit transmits the list of one or more applications to the first communication unit in response to receiving the request.

17. The system according to claim 16, wherein the NFC terminal further comprises an NFC reading unit to read tag information, the tag information comprising the NFC header information.

18. The system according to claim 16, wherein the NFC management server provides the list of one or more applications to the NFC terminal based on the NFC header information.

* * * * *